C. H. Hinckley,
Coating Hose-Pipe,
No. 969, Reissued June 5, 1860.
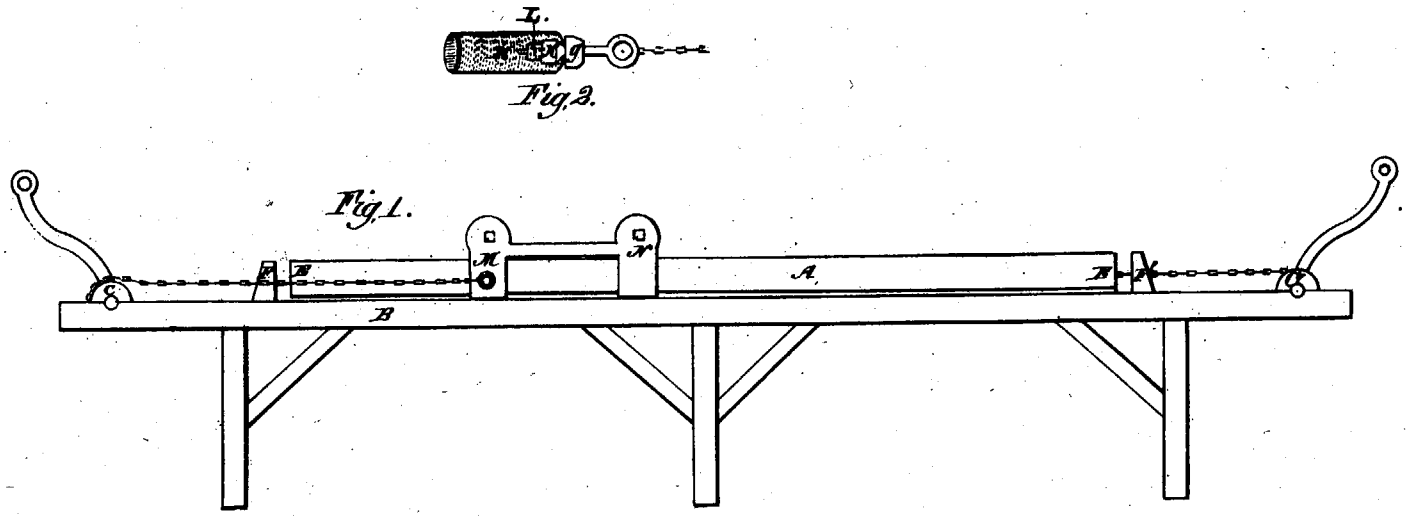
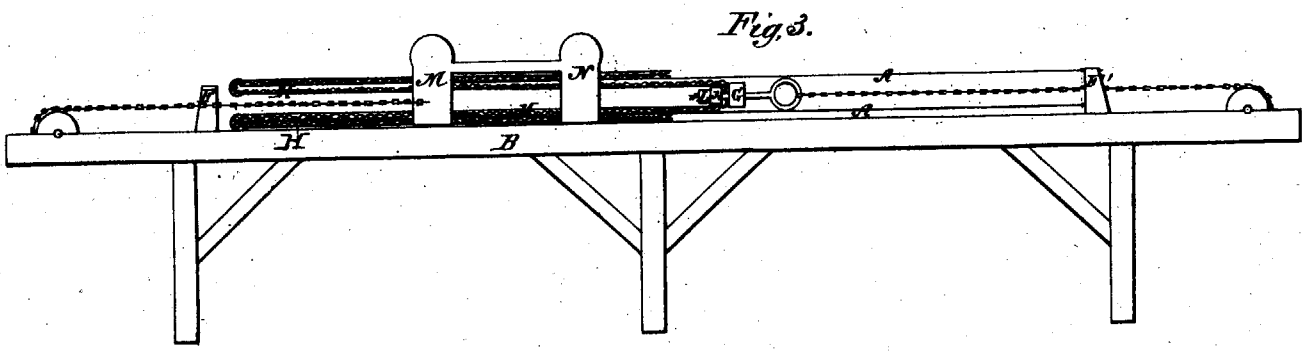

UNITED STATES PATENT OFFICE.

THE NEW YORK RUBBER COMPANY, OF NEW YORK, N. Y., ASSIGNEE OF CHARLES H. HINCKLEY

IMPROVEMENT IN COATING HOSE-PIPE.

Specification forming part of Letters Patent No. 18,281, dated September 29, 1857; Reissue No. 969, dated June 5, 1860.

*To all whom it may concern:*

Be it known that CHARLES H. HINCKLEY, of Stonington, New London county, and State of Connecticut, has invented a new and useful Improvement in the Manufacture of Hose-Pipe; and I do hereby declare that the following is a full and clear description thereof.

The principle of this invention consists in a peculiar mode of applying a coating of suitable cement of water proof character to the inside of a hose-pipe or flexible tube composed of fibrous material.

Hose has before been formed from cloth coated with india-rubber on its one side or face and wound so as to comprise several thicknesses or layers of the cloth, each thickness either being coated with rubber or the different folds or thicknesses connected by cement composed of a solution of rubber. There are many objections to a hose or pipe thus made, besides its expense, among which may be named the rotting of the cloth by sweating produced by the rubber or cement with which the cloth is incorporated, and within which it is confined. These objections are avoided by the present invention, and the fibrous material employed may be coarse and strong canvas without seam, or any other suitable fibrous body, which, being arranged wholly on the outside of the cement forming the hose-lining, and being free from intermediate coatings of cement, admits of more perfect ventilation through the body of the cloth, and so reduces or obviates sweating and rotting; and as by the present invention the hose has its lining of cement first applied to or on the surface, which, during manufacture, forms the outside of the pipe, and then the hose is turned inside out, a most perfect, cheap, and durable hose of any desired size, impervious to water on the inside, may be produced.

Any suitable machinery may be employed for carrying into effect this invention; but the following description will suffice to show how a hose may be constructed in accordance with it.

A pipe may be prepared by weaving a tube of strong hemp cord or twine, or made in any other way, of any suitable fibrous material, and then any suitable water-proof coating applied on and firmly secured to the outer (for the time being) surface of said pipe. This pipe, thus coated, is then turned inside out, so as to bring the water-proof coating within, and whereby said coating is made an internal lining.

Referring to the accompanying drawings, to illustrate one means or mode of or for manufacturing such a hose, the part marked A in Figure 1 represents a copper or brass pipe of a size that will just pass within the canvas or other fibrous tube, and of a length equal to the greatest length of the pipe to be turned as above mentioned. The ends of this metal pipe should be wired or turned over, so as to present a smooth and easy passage from the outer to the inner surface. Fig. 3 is a vertical section showing the position of the hose-pipe during its transformation while passing on and through the metal pipe. This metallic pipe is placed on a table or bench, B, a little longer than itself, at each end of which is a windlass, C and C′. The canvas pipe is first drawn on over the metal pipe from the end E′ by connecting its end to the chain of the windlass C and turning the windlass while the end E of the pipe bears against a brace, F, fastened to the bench. When this is accomplished, a chain from the windlass C′ is passed through the pipe and connected by a clasp, Figs. 2 and 3, to the end of the canvas pipe H, which is turned or folded in between a flange, *g*, and follower or grip, K, when a nut, L, is screwed up and holds it firmly. The winch C′ is then turned so as to draw the clasp, and with it the end of the canvas pipe or hose, within and through the interior of the metal pipe, while the other winch, C, is also applied to draw or force the hose on the outside toward the entering end E by means of its attachment to clasps M N, which may be made to clasp the hose-pipe with any required degree of force, and may be changed from one position thereon to another as may be required by the advance of the pipe. The metal pipe during this latter action presses against and is held by the brace F′. The action being continued according to this arrangement, the hose is drawn wholly through the metal pipe, and is turned so that the coating of rubber or other cement which was on the outside is now within, and the hose is now completed and ready to receive the proper couplings for connecting the joints and for coating or painting on the outside if desired. In this manner from fifty to one hundred feet in length can be turned in one piece. The metallic pipe A, used in turning the hose, should be smooth and free from obstructions at the joints or connections of the different pieces of which it is composed, and it may be lubricated, if necessary, in order to reduce the friction of the hose in passing on and through it. It is evident that if the tube be coated with a vulcanizable india rubber or gutta percha compound it is necessary to effect the vulcanization by submitting it to the proper degree of temperature; but to this—*i. e.*, the mere vulcanizing of the india-rubber or gutta-percha coating—I lay no claim.

What is here claimed is—

Constructing hose or flexible tubing of textile and fibrous material with an internal waterproof coating by first applying said coating on the outside of the cloth or other pipe and then inverting the coated pipe by drawing it over and through a metallic cylinder, or otherwise suitably inverting the same.

In testimony whereof I, the executive officer of the NEW YORK RUBBER COMPANY, have signed my name in presence of two witnesses.

BENJ. F. LEE,

*Treasurer of New York Rubber Company.*

Witnesses:

JOHN MACKENZIE,

FRANCIS E. OLIVER.